(12) United States Patent
Hoyt et al.

(10) Patent No.: US 7,046,417 B2
(45) Date of Patent: *May 16, 2006

(54) FOLDED LIQUID-CRYSTAL VARIABLE OPTICAL ATTENUATOR

(75) Inventors: Clifford C. Hoyt, Needham, MA (US); Peter J. Miller, Newburyport, MA (US)

(73) Assignee: Cambridge Research and Instrumentation, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,206

(22) Filed: Jul. 6, 2004

(65) Prior Publication Data

US 2004/0240026 A1 Dec. 2, 2004

Related U.S. Application Data

(63) Continuation of application No. 10/053,470, filed on Nov. 2, 2001, now Pat. No. 6,781,739.

(60) Provisional application No. 60/245,418, filed on Nov. 2, 2000.

(51) Int. Cl.
*G02F 1/03* (2006.01)
*G02F 1/01* (2006.01)
*G02B 6/26* (2006.01)

(52) U.S. Cl. .......... 359/256; 359/238; 359/245; 359/246; 385/16; 385/18; 385/20; 385/24

(58) Field of Classification Search .......... 359/237, 359/244–247, 253, 256, 299, 490, 634, 732; 385/16, 24, 34, 37, 18, 20, 33
See application file for complete search history.

(56) References Cited

U.S. PATENT DOCUMENTS 3,684,350 A 8/1972 Wentz .......... 359/256
4,410,238 A 10/1983 Hanson .......... 349/196
5,414,540 A 5/1995 Patel et al. .......... 349/196
5,414,541 A 5/1995 Patel et al. .......... 349/196
5,724,165 A 3/1998 Wu .......... 398/55
5,727,109 A 3/1998 Pan et al. .......... 385/140
5,847,831 A 12/1998 Tomlinson, III et al. .... 356/364
5,963,291 A 10/1999 Wu et al. .......... 349/196
6,181,846 B1 1/2001 Pan .......... 385/18
6,498,872 B1* 12/2002 Bouevitch et al. .......... 385/24
6,535,257 B1 3/2003 Miller .......... 349/113
6,781,736 B1* 8/2004 Hoyt et al. .......... 359/256
6,859,573 B1* 2/2005 Bouevitch et al. .......... 385/16

FOREIGN PATENT DOCUMENTS

EP 0 017 528 10/1980
EP 0 959 375 11/1999
WO 99/67679 12/1999

* cited by examiner

*Primary Examiner*—Loha Ben
(74) *Attorney, Agent, or Firm*—Fish & Richardson P.C.

(57) ABSTRACT

A variable optical attenuator including: a birefringent element positioned to separate an input optical signal into two spatially separated, orthogonally polarized beams; a LC modulator positioned to receive the orthogonally polarized beams and selectively alter their polarizations; a reflective element positioned to reflect the beams back through the LC modulator and the birefringent element, wherein the birefringent element recombines orthogonally polarized components of the reflected beams to produce an output optical signal; and a controller coupled to the LC modulator to selectively cause the LC modulator to alter the polarizations of the orthogonally polarized beams, wherein during operation the controller is responsive to a request to variably attenuate the intensity of the output optical signal relative to the intensity of the input optical signal to one of multiple non-zero attenuation settings.

18 Claims, 6 Drawing Sheets

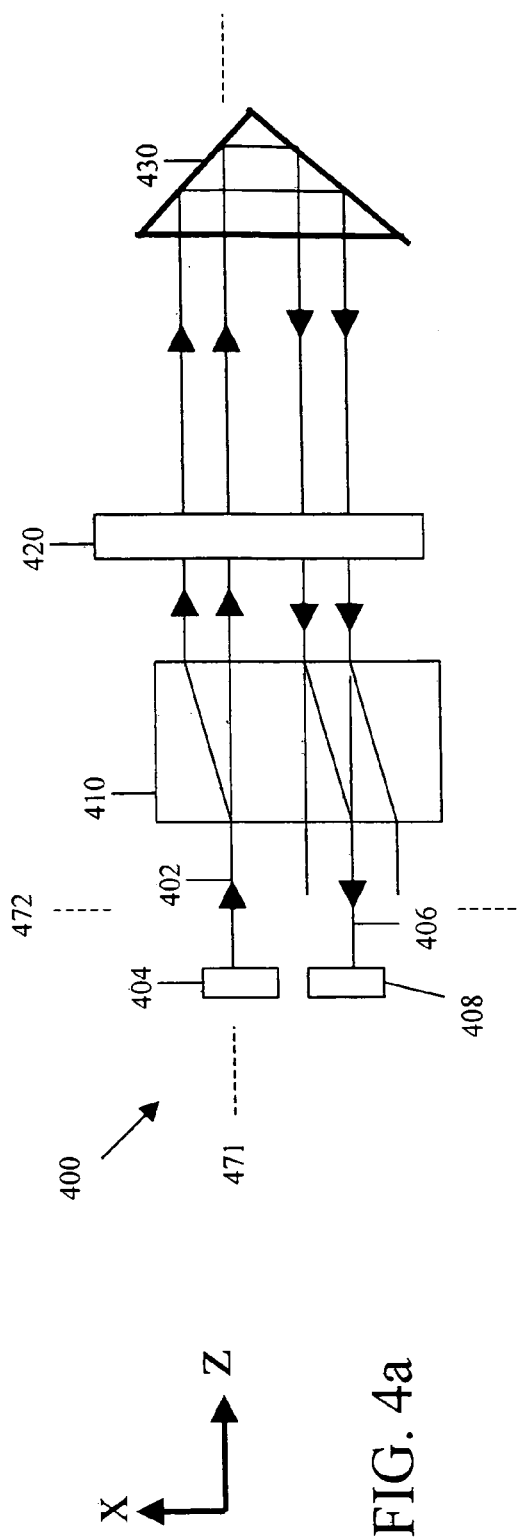
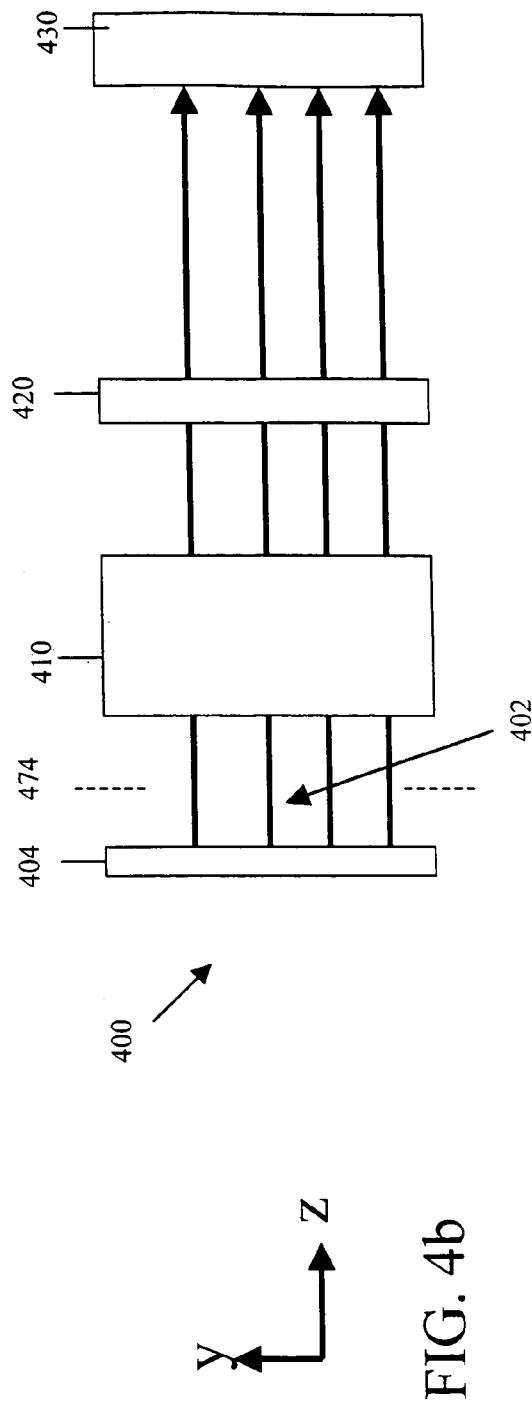
FIG. 4a
FIG. 4b

FOLDED LIQUID-CRYSTAL VARIABLE OPTICAL ATTENUATOR

CROSS-REFERENCE TO RELATED APPLICATIONS

This application is a continuation of patent application Ser. No. 10/053,470, filed on Nov. 2, 2001 now U.S. Pat. No. 6,781,736, which claims priority to U.S. Provisional Application No. 60/245,418 filed on Nov. 2, 2000 and entitled "Liquid Crystal Variable Optical Attenuator," the contents of said applications being incorporated herein by reference.

BACKGROUND

Currently, many telecommunication networks send and receive information as optical signals. Such networks can provide significantly greater bandwidth than their electrical wire counterparts. One reason for this is that a single optical fiber can carry multiple (e.g., 80 or more) signals on different wavelength channels simultaneously. In practice, such networks are highly dynamic and power in any given channel may fluctuate relative to other channels because of, for example, wavelength drift in network components, channel add/drops, and path reconfigurations. Thus it is often necessary to variably attenuate the intensity of a given optical signal in one or more channels. For example, this may be necessary to minimize channel cross-talk caused by nonlinear interactions between different channels.

SUMMARY

In general, in one aspect, the invention features a variable optical attenuator including: a birefringent element positioned to separate an input optical signal into two spatially separated, orthogonally polarized beams; a liquid crystal (LC) modulator positioned to receive the orthogonally polarized beams and selectively alter their polarizations; and a reflective element positioned to reflect the beams back through the LC modulator and the birefringent element, wherein the birefringent element recombines orthogonally polarized components of the reflected beams to produce an output optical signal. The variable optical attenuator may further include a controller coupled to the LC modulator to selectively cause the LC modulator to alter the polarizations of the orthogonally polarized beams. During operation the controller responds to a request to variably attenuate the intensity of the output optical signal relative to the intensity of the input optical signal to one of multiple non-zero attenuation settings.

Embodiments of the variable optical attenuator may further include any of the following features.

The variable optical attenuator may further include an input port positioned to direct the input optical signal into the birefringent element and an output port positioned to receive the output optical signal from the birefringent element.

Moreover, the variable optical attenuator may further include additional input ports each directing an additional input optical signal into the birefringent element and on through the LC modulator and the reflective element, and additional output ports each positioned to receive an additional output optical signal from the birefringent element. Each additional output optical signal corresponds to one of the additional input optical signals after it is reflected back through the LC modulator and the birefringent element by the reflective element. Furthermore, the reflective element may be a right-angle prism, and the additional input ports and the additional output ports can each extend along an axis substantially parallel to a fold axis defined by the right-angle prism.

The LC modulator may further include multiple, independently addressable regions for selectively altering the polarization of an incident beam. For example, the birefringent element may direct a first one of the spatially separated beams to pass through a first one of the addressable regions of the LC modulator and a second one of the spatially separated beams to pass through a second one of the addressable regions of the LC modulator. Furthermore, the reflective element may reflect the first beam to pass back through the first addressable region of the LC modulator and the second beam to pass back through the second addressable region of the LC modulator. Alternatively, the reflective element may reflect the first beam to pass through the second addressable region of the LC modulator and the second beam to pass through the first addressable region of the LC modulator. Furthermore, the reflective element may reflect the first beam to pass through a third addressable region of the LC modulator and the second beam to pass through a fourth addressable region of the LC modulator.

During operation the controller may drive the multiple regions of the LC modulator to cause an intensity ratio of the orthogonally polarized components of the output signal to substantially equal an intensity ratio of the orthogonally polarized beams derived from the input signal.

The LC modulator may include a LC layer sandwiched between a first substrate supporting a ground electrode and a second substrate supporting multiple electrodes corresponding to the multiple, independently addressable regions. It may further include a fixed retarder layer in series with the LC layer. The LC layer may include nematic LCs aligned with respect to an alignment axis in the plane of the LC layer. For example, the alignment axis may be at angle of about 45° to an axis defined by the spatial separation of the orthogonally polarized beams derived from the input beam. Alternatively, the LC layer may include twisted nematic LCs.

In some embodiments, the variable optical attenuator further includes a dichroic polarizer positioned between the LC modulator and the reflective element. For example, the dichroic polarizer may be positioned to absorb a selected polarization component of the beams for a first pass from the LC modulator to the reflective element and for a second pass from the reflective element back to the LC modulator. The dichroic polarizer may have a dichroic axis aligned either parallel or orthogonal to an axis defined by the spatial separation of the orthogonally polarized beams derived from the input beam.

The reflective element may be, for example, a mirror oriented to receive the beams at a non-normal angle, a corner cube retroreflector, or a right-angle prism. In the latter case, the variable optical attenuator may further include a retarder element positioned between the LC modulator and the right-angle prism. The retarder element may be configured to offset polarization-dependent phase changes to the beams caused by non-normal reflections from the right-angle prism. The retarder element may be further configured to compensate for a geometric inversion caused by the right-angle prism.

The variable optical attenuator may further include a LC monitor coupled to the LC modulator and the controller. For example, the LC monitor may include a reference light source providing a polarized source beam. The reference light source may include an LED or a laser diode, in series with a film polarizer. During operation, the reference light source directs the polarized reference beam through an active region of the LC modulator to produce a signal beam. The LC monitor further includes a polarizer positioned to receive the signal beam and produce a polarized signal beam, and a detector for monitoring the intensity of the polarized signal beam.

The LC modulator may provide a tunable retardance spanning a range of less than 450 nm for a single pass.

In general, in another aspect, the invention features a variable optical attenuator including: a birefringent element positioned to separate an input optical signal into two spatially separated, orthogonally polarized beams; a LC modulator positioned to receive the orthogonally polarized beams and selectively alter their polarizations; a reflective element positioned to reflect the beams back through the LC modulator and the birefringent element, wherein the birefringent element recombines orthogonally polarized components of the reflected beams to produce an output optical signal; and a dichroic polarizer between the LC modulator and the reflective element, wherein the polarizer is positioned to contact the beams during at least one of a first pass from the LC modulator to the reflective element and a second pass from the reflective element back to the LC modulator.

Embodiments of the variable optical attenuator may further include any of the following features. The polarizer may be positioned to contact the beams during both passes. The dichroic polarizer may have a dichroic axis aligned either parallel or orthogonal to an axis defined by the spatial separation of the orthogonally polarized beams derived from the input beam. The LC modulator may include multiple, independently addressable regions for selectively altering the polarization of an incident beam.

In general, in another aspect, the invention features a variable optical attenuator including: a birefringent element positioned to separate an input optical signal into two spatially separated, orthogonally polarized beams; a LC modulator positioned to receive the orthogonally polarized beams and selectively alter their polarizations; and a right-angle prism positioned to reflect the beams back through the LC modulator and the birefringent element, wherein the birefringent element recombines orthogonally polarized components of the reflected beams to produce an output optical signal.

Embodiments of the variable optical attenuator may further include any of the following features.

The variable optical attenuator may further include a retarder element positioned between the LC modulator and the right-angle prism, wherein the retarder element is configured to offset polarization-dependent phase changes to the beams caused by non-normal reflections from the right-angle prism. The retarder element may be further configured to compensate for a geometric inversion caused by the right-angle prism.

The LC modulator may include multiple, independently addressable regions for selectively altering the polarization of an incident beam.

The variable optical attenuator may further include a dichroic polarizer between the LC modulator and the right-angle prism, wherein the polarizer is positioned to contact the beams during at least one of a first pass from the LC modulator to the right-angle prism and a second pass from the right-angle prism back to the LC modulator.

The variable optical attenuator may further include an input fiber array positioned to launch the first mentioned input optical signal and additional input optical signals into the birefringent element, and an output fiber array positioned to receive the first mentioned output optical signal and additional output optical signals from the birefringent element. For example, the input fiber array and the output fiber array may each extend along axes substantially parallel to a fold axis defined by the right-angle prism. Furthermore, the transverse position and orientation of the right-angle prism can be selected to optimize the coupling of each output beam to a corresponding fiber of the output fiber array. Moreover, to accommodate the multiple input beams, the LC modulator may include multiple, independently addressable regions extending along multiple directions for selectively altering the polarization of an incident beam.

In general, in another aspect, the invention features a method for variably attenuating an input optical signal to one of multiple non-zero attenuation settings. The method includes: separating the input optical signal into two spatially separated, orthogonally polarized beams by directing it through a birefringent element; selectively altering the polarizations of the orthogonally polarized beams based on a desired attenuation setting by directing the orthogonally polarized beams through a LC modulator; and reflecting the beams back through the LC modulator and the birefringent element, wherein the birefringent element recombines orthogonally polarized components of the reflected beams to produce an output optical signal. Embodiments of the method may further include features corresponding to any of the variable optical attenuator features described above.

Embodiments of the invention may include any of the following advantages.

The folded optical arrangement provides a compact structure that obviates the need for a second birefringent element. Furthermore, because the same birefringent element is used to separate and subsequently recombine orthogonal polarization components, the thickness of the element does not need to be tightly controlled. The folded arrangement also provides a double pass through the LC modulator, thereby providing the performance of a two-stage LC device for the cost of one.

Similarly, in those embodiments employing the dichroic polarizer, the folded arrangement provides a double pass through the dichroic polarizer, thereby doubling the extinction ratio of the polarizer. Moreover, the combination of the folded arrangement and the dichroic polarizer provides two stages of attenuation, thereby doubling the attenuation range of the device as a whole.

Furthermore, embodiments that include the right-angle prism can include a compensating retarder that offsets polarization-dependent phase shifts caused by the two reflections in the prism.

The right-angle prism also provides a configuration that easily accommodates multiple input beams. Moreover, translation and/or rotation of the right angle prism provide degrees of freedom for aligning the resulting output beams with a corresponding fiber array. Embodiments that involve multiple input beams can be used for spectral band equalization in wavelength division multiplexing (WDM) optical systems.

Finally, embodiments that include the retardance monitor enable in-situ compensation of temperature sensitivities and aging.

Other features, objects, and advantages of the invention will be apparent from the following detailed description.

DESCRIPTION OF DRAWINGS

The invention will now be further described merely by way of example with reference to the accompanying drawings in which:

FIGS. 4a–4d are schematic diagrams of a folded LC VOA 400 that indeperdently attenuates multiple input beams 402. FIGS. 4a and 4b show cross-section diagrams in the x-z and y-z planes, respectively. FIGS. 4c and 4d show the change in position of multiple output beam 408 in response to a translation of a right-angle prism 430 in the x-axis (FIG. 4c) and a rotation of the prism about the z-axis (FIG. 4d).

Like reference symbols in the various drawings indicate like elements.

DETAILED DESCRIPTION

Figure 1:
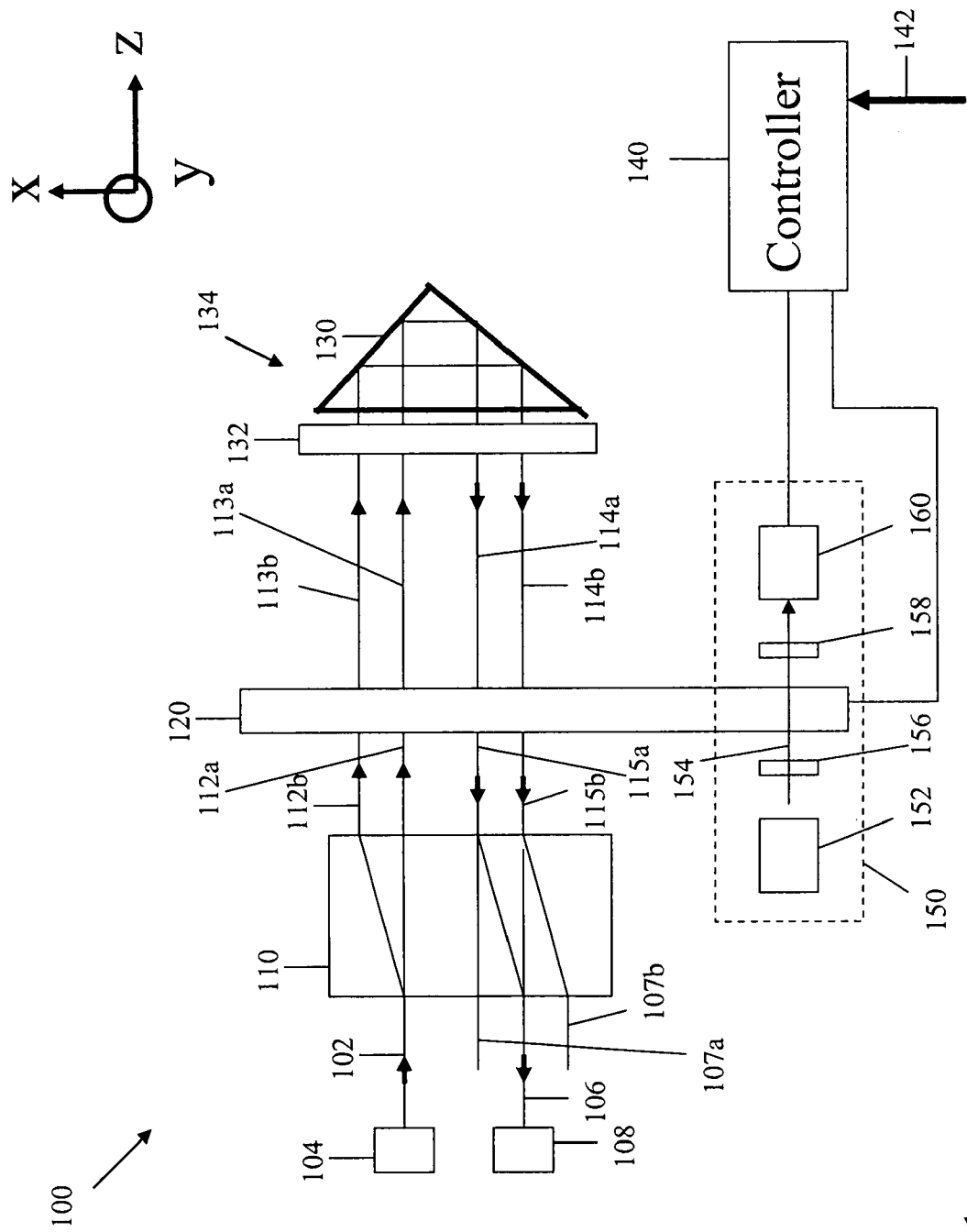
FIG. 1 is a schematic diagram of one embodiment of a folded, liquid crystal (LC) variable optical attenuator (VOA) 100, in which beams double pass a LC modulator 120.

The invention features a folded, liquid-crystal(LC)-based, variable optical attenuator (VOA) 100 as shown in FIG. 1. VOA 100 includes a birefringent element 110 (e.g., calcite), a LC modulator 120, and a right-angle prism 130, all in optical series.

A lens 104 (e.g., a gradient-index lens or a microlens) defines an input port for coupling an input beam 102 from an input optical fiber (not shown) into birefringent element 110. As a coordinate system, we will define the propagation direction of input beam 102 as the z-axis, the plane of FIG. 1 as the x-z plane, and the axis orthgoonal to the plane of FIG. 1 as the y-axis. The birefringent element separates input beam 102 into two spatially separated, orthogonally linearly polarized beams 112a and 112b propagating parallel to the z-axis. In the embodiment shown in FIG. 1, the birefringent element is calcite cut with its optic axis at 45 degrees to the z-axis in the x-z plane. This orientation of the optic axis causes the component of the input beam linearly polarized along the y-axis to propagate straight through the element and emerge as beam 112a. On the other hand, it causes the component of the input beam linearly polarized along the x-axis to deflect at a 6 degree angle within the element and emerge as beam 112b. In other embodiments, a different birefringent material or a different optic axis orientation may be used.

Beams 112a and 112b then pass through LC modulator 120, which selectively alters their polarizations in response to a drive signal from a controller 140 to define beams 113a and 113b. As described in greater detail further below, LC modulator may include multiple, independently addressable regions to independently alter the polarizations of beams 112a and 112b.

Following LC modulator 120, right-angle prism 130 reflects beams 113a and 113b back through LC modulator 120 and birefringent element 110 to define parallel propagating beams 114a and 114b, respectively. Prism 130 is formed from a material with an index large enough to cause beams 113a and 113b to totally internally reflect from the two 45-degree surfaces of the prism, thereby reducing any spurious transmission through the prism. Following the prism, LC modulator 120 again selectively alters the polarizations of the incident beams, which in this case are beams 114a and 114b, to define beams 115a and 115b, respectively. Right-angle prism 130 causes the separation of beams 115a and 115b equal to that of beams 112a and 112b. As a result, birefringent element 110 combines the linear polarization component of beam 115a orthogonal to that of beam 112a with the linear polarized component of beam 115b orthogonal to that of beam 112b to form output beam 106. The remaining polarization components from beams 115a and 115b emerge as waste beams 107a and 107b. A second lens 108 (e.g., a gradient-index lens or a microlens) defines an output port for coupling output beam 106 (but not either of waste beams 107a and 107b) from birefringent element 110 to an output optical fiber (not shown). Notably, the optical path length through VOA 100 for the beams that emerge as components of the output beam are substantially equal. As a result, there is no group delay between the orthogonal polarization components of the output beam. Such group delay can cause pulse broadening and degrade optical signals.

The ratio of the intensity of output beam 106 to that of input beam 102 depends on the degree to which LC modulator 120 alters the polarizations of beams 112a, 112b, 114a and 114b. The attenuation range may be limited, however, by polarization-dependent phase changes caused by the reflections from prism 130. In particular, components of beams 113a and 113b polarized along the x-axis will see a phase change on reflection different from that for components of beams 113a and 113b polarized along the y-axis. In other words, prism 130 defines a polarization-altering element with principal axes of polarization aligned along the x- and y-axes. Such polarization rotation may complicate that performed by the LC modulator and limit the attenuation range of the VOA. The retardance caused by the prism, however, may be calculated theoretically using well-known equations for the phase change on reflection, and therefore it can be compensated with a suitable retarder element.

In addition, prism 130 causes a geometric inversion of the polarization of the reflected beams about the y-axis. If desired, the retarder element may further compensate for the geometric inversion by having it introduce an additional half-wave retardance along either the x- or y-axes.

Referring again to FIG. 1, a retarder element 132 is positioned between LC modulator 120 and prism 130 to compensate for the polarization effects caused by prism 130. The embodiment of FIG. 1 shows beams 113a, 113b, 114a and 114b all passing through element 132. Element 132 is oriented with its fast axis aligned with the slow axis of prism 130 and its slow axis aligned with the fast axis of prism 130. In one set of embodiments, the thickness of element 132 is selected to produce a net retardance opposite to that caused by the two reflections in prism 130. In other embodiments, the thickness of element 132 is selected to produce a net retardance opposite to that caused by the two reflections in prism 130 and to further impart a half-wave retardance to compensate for the geometric inversion.

If we define the combination of prism 130 and retarder element 132 as a compensated right-angle prism 134, beams 114a and 114b reflect from compensated prism 134 with the same polarization, respectively, as incident beams 113a and 113b. Suitable materials for retarder element 132 include, e.g., a birefringent polymer film or crystalline quartz. Element 132 may be bonded to the front face of prism 130 (as shown in FIG. 1), it may be bonded to the back face of LC modulator 120, or it may be spaced from both components. Furthermore, in other embodiments, the retarder element need not contact all of beams 113a, 113b, 114a and 114b. For example, it may be positioned to contact only beams 113a and 113b or only beams 114a and 114b, in which case the thickness of the retarder element is doubled to achieve the correct net retardance.

Figure 2:
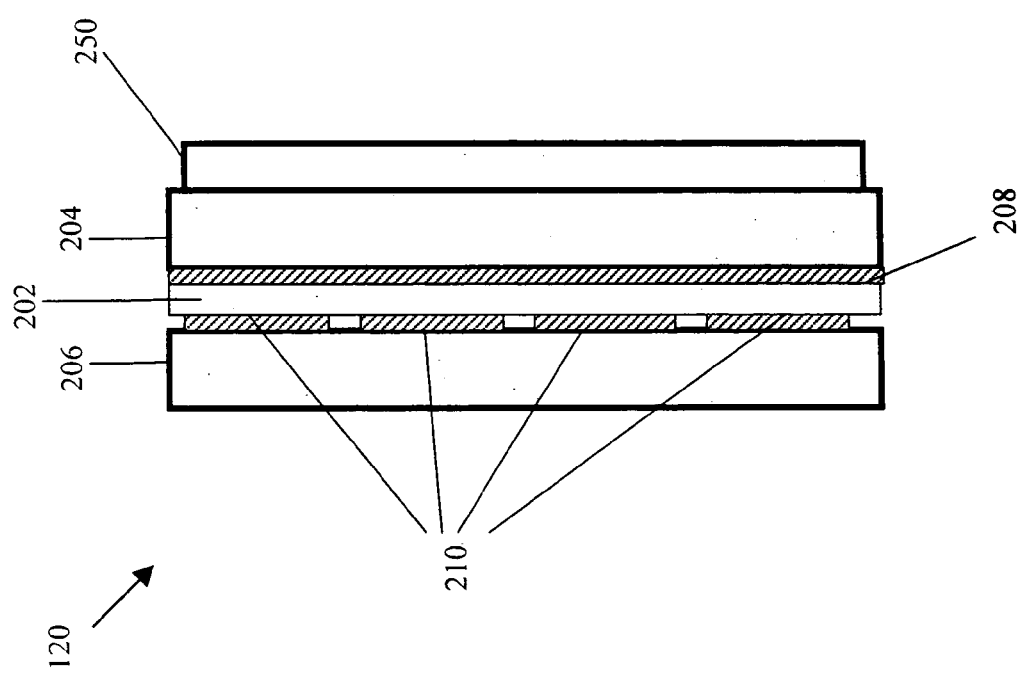
FIG. 2 is schematic diagram of a LC modulator 120 used in LC VOA 100 shown in FIG. 1.

During operation LC modulator 120 causes a variable change in the polarization of the incident beams to provide a variable attenuation of the intensity of output beam 106 with respect to the intensity of input beam 102. Referring to FIG. 2, LC modulator 120 includes a LC layer 202 sandwiched between two substrates (e.g., glass substrates) 204 and 206. One of the substrates (e.g., substrate 204 in FIG. 2) includes a conductive layer (e.g., indium tin oxide (ITO)) to define a ground electrode 208. The other substrate (e.g., substrate 206 in FIG. 2) includes a conductive layer (e.g., ITO) patterned into one or more electrodes 210 corresponding to independently addressable regions of the modulator. In some embodiments, two or more electrodes are shorted together to receive a common drive signal from the controller so that these electrodes as a whole define a common addressable region of the LC layer. During operation controller 140 sends a variable voltage setting to each of the different electrodes to alter the corresponding LC orientation in LC layer 202. Such a change in LC orientation causes a corresponding change in the polarization of an incident beam.

Referring again to FIG. 1, many different configurations of LC modulator 120 are possible for LC VOA 100. For example, the LCs in the modulator may be twisted nematic LCs or non-twisted nematic LCs, or any other LC-device that can cause a polarization-rotating or altering effect. Furthermore, the modulator may include a single addressable region or multiple addressable regions. In the latter case, the LC modulator may be configured so that each of beams 112a, 112b, 114a and 114b pass through a separate, independently addressable region of the LC modulator. Alternatively, subsets of such beams may pass through a common addressable region of the LC modulator. In the following paragraphs, we will consider various embodiments based on a non-twisted nematic LC layer.

For a non-twisted nematic LC modulator in the absence of an applied field, the LCs are substantially aligned along an alignment axis in the plane of the LC layer (i.e., in the x-y plane with respect to FIG. 1). As a voltage is applied to particular region of the modulator across the LC layer, the LCs twist towards the z-axis, thereby changing the birefringence seen by light incident on the modulator from the z-axis. Accordingly, the LC modulator variably retards light linearly polarized along the alignment axis relative light linearly polarized orthogonal to the alignment axis. This differential retardance $\Delta\phi_i$ for a given region "i" of the LC modulator can be expressed in radians as:

$$\Delta\phi_i = 2\pi n(V_i) L/\lambda \quad (1),$$

where $n(V_i)$ is the birefringence of the modulator at region i as a function of the voltage $V_i$ to the electrode corresponding to region i, L is the thickness of the LC layer, and $\lambda$ is the wavelength of the incident light.

Referring to the embodiment of FIG. 1, a suitable alignment axis for the LCs is at +/−45 degrees to the x-axis in the x-y plane. For such an arrangement, and for the case where retarder 132 is selected to compensate for both the polarization dependent phase changes and the geometric inversion caused by prism 130, the fraction of energy $I_y$ in beam 112a that emerges in output beam 106, assuming no spurious losses, can be expressed as:

$$I_y = \sin^2[(\Delta\phi_2 + \Delta\phi_3)/2] \quad (2)$$

where the subscript y denotes the fact that the energy in beam 112a corresponds to the energy in input beam 102 that is linearly polarized along the y-axis, $\Delta\phi_2$ corresponds to the retardance imparted by LC modulator 120 to beam 112a, and $\Delta\phi_3$ corresponds to the retardance imparted by LC modulator 120 to beam 114a. Similarly, the fraction of energy $I_x$ in beam 112b that emerges in output beam 106, assuming no spurious losses, can be expressed as:

$$I_x = \sin^2[(\Delta\phi_1 + \Delta\phi_4)/2] \quad (3)$$

where the subscript x denotes the fact that the energy in beam 112a corresponds to the energy in input beam 102 that is linearly polarized along the x-axis, $\Delta\phi_1$ corresponds to the retardance imparted by LC modulator 120 to beam 112b, and $\Delta\phi_4$ corresponds to the retardance imparted by LC modulator 120 to beam 114b.

Eqs. (2) and (3) show that the retardance for each pass through the LC modulator adds algebraically for each of the orthogonally polarized components of the input beam. Furthermore, the equations show that a complete range of attenuation is possible provided the total retardance spans a range of π radians. Assuming that the thickness of the LC layer is uniform, this requirement can be expressed as:

$$\Delta n(0) - \Delta n(\infty) > \lambda/4L \quad (4).$$

Furthermore, Eqs. (2) and (3) show that in embodiments where the LC modulator includes only a single addressable region (and as a result $\Delta\phi_1 = \Delta\phi_2 = \Delta\phi_3 = \Delta\phi_4$), the full range of attenuation is still possible. Moreover, there is equal attenuation for the orthogonal linear polarization components of input beam 102, i.e., $I_y = I_x$. This result is important because it means that the overall attenuation of the output beam relative to the input beam will not depend on the state of polarization of the input beam.

In other embodiments, there are multiple addressable regions so that the value of $\Delta\phi_2 + \Delta\phi_3$ can be varied independently of $\Delta\phi_1 + \Delta\phi_4$, and thus VOA 100 is capable of unequally attenuating the orthogonal linear polarization components of input beam 102, which may be useful for compensating for polarization dependent loss (PDL) in the input beam.

In additional embodiments, there are multiple addressable regions so that the value of $\Delta\phi_2$ can be varied independently from the value of $\Delta\phi_3$, and similarly, the value of $\Delta\phi_1$ can be varied independently from the value of $\Delta\phi_4$. Such independence provides finer resolution in Eqs. (2) and (3). It also allows a desired attenuation to be achieved with several possible voltage settings, some of which may correspond to portions of the voltage-birefringence calibration curve that are less sensitive to noise sources (e.g., temperature, aging, voltage errors, etc.). Such advantages may be achieved by defining one addressable region to correspond to $\Delta\phi_1$ and $\Delta\phi_2$ (or $\Delta\phi_1$ and $\Delta\phi_3$) and another addressable region to correspond to $\Delta\phi_3$ and $\Delta\phi_4$ (or $\Delta\phi_2$ and $\Delta\phi_4$). Alternatively, the retardances may correspond to separate, independently addressable region so that, for example, VOA 100 is capable of compensating for PDL.

VOA 100 of FIG. 1 provides a single stage of attenuation with a double pass through LC modulator 120. One advantage of this configuration is that VOA 100 has a more rapid response time than that of a single-pass LC VOA. This is because the response time corresponding to a change in attenuation setting depends on the degree to which the LCs change their orientation. In a double pass configuration, a change in LC orientation is seen twice by the light, thereby effectively doubling the change in retardance. Thus, smaller changes in LC orientation are required to produce a desired change in attenuation relative to a single-pass LC VOA. Similarly, the thickness of the LC layer in the double-pass configuration can be smaller than that of a single-pass LC VOA because a variable retardance range spanning one-half wave can be achieved by using a variable retardance range spanning only one-quarter wave in each pass. For example, for light in the range of about 1.3 to 1.6 microns, the LC layer in VOA 100 need only provide a variable retardance spanning a range of about 400 to 500 nm, whereas a single pass configuration would require a corresponding range of at least 800 nm.

Another advantage of the double pass arrangement of VOA 100 is that it is less sensitive to thickness gradients in the LC layer that may otherwise produce linear deviations from a desired retardance. This is because of the double pass through the Lc modulator. For example, a first pass through a thicker region of the LC layer, is offset by the second pass through the corresponding thinner region of the LC layer, and vice-versa. Hence the total retardance is a mean that filters the linear thickness gradient.

As described above, Eqs. (2) and (3) correspond to embodiments where retarder 132 is selected to compensate for both the polarization dependent phase changes and the geometric invention caused by prism 130. In other embodiments, where retarder 132 is selected to retain the geometric inversion, the net retardance is given by the difference in retardance between the first and second passes. In other words, the signs in the arguments of Eqs. (2) and (3) are reversed, i.e., $\Delta\phi_2 - \Delta\phi_3$ and $\Delta\phi_1 - \Delta\phi_4$.

Figure 3:
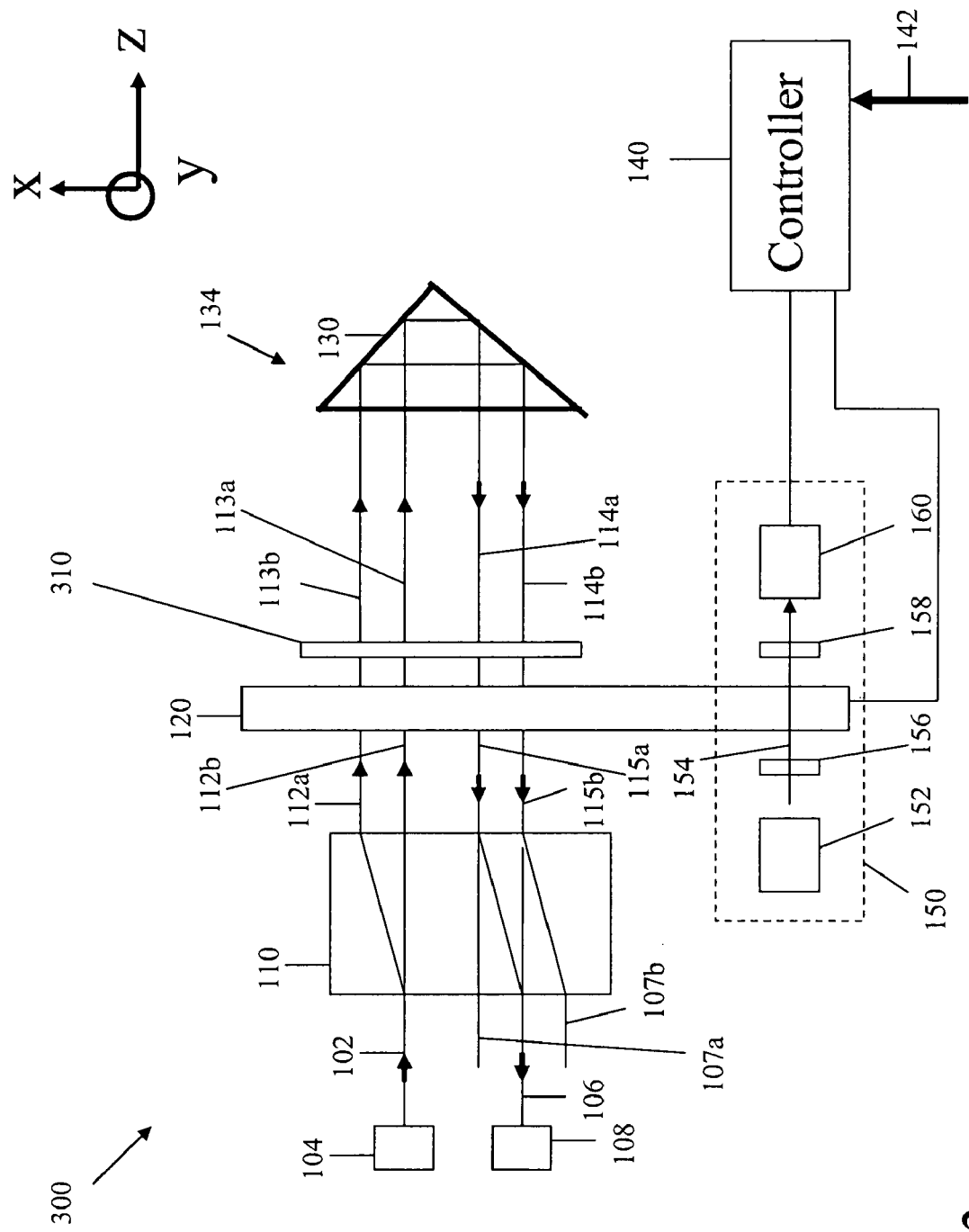
FIG. 3 is a schematic diagram of another embodiment of a folded LC VOA 300, which includes a dichroic polarizer 310 to provide a separate stage of attenuation for each pass through LC modulator 120.

In another embodiment shown in FIG. 3, a VOA 300 includes two stages of attenuation, one corresponding to each of two passes through LC modulator. An advantage of this configuration is that the two stages of attenuation provide a greater range of attenuation (e.g., a range of about 60 dB). Referring to FIG. 3, VOA 300 is identical to VOA 100 shown in FIG. 1 except that a dichroic polarizer 310 is positioned between LC modulator 120 and prism 130, and retarder 132 (shown in FIG. 1) is no longer present. Notably, the presence of polarizer 310 obviates the polarization effects of prism 130, and so retarder 132 is no longer necessary.

Dichroic polarizer 310 absorbs light linearly polarized along a first axis and substantially transmits light linearly polarized along the axis orthogonal to the first axis. For example, suitable dichroic polarizers include POLARCOR™ (Corning, N.Y.). Polarizer 310 attenuates beams 113a and 113b as they pass through it according to their polarization states, which is defined by the first pass through LC modulator 120. Accordingly, the first pass through LC modulator 120 and polarizer 310 provide a first stage of variable attenuation. The beams emerge from polarizer 310 linearly polarized.

Upon being reflected from prism 130, beams 114a and 114b pass back through polarizer 310, which further purifies their linear polarization. Thereafter, beams 114a and 114b pass through LC modulator 120, which selectively alters their polarizations to form beams 115a and 115b. As in LC VOA 110, birefringent element 110 then recombines orthogonally polarized components of beams 115a and 115b to form output beam 106, with the remaining components being directed away from the output beam. Thus, the birefringent element 110 and the second pass through LC modulator 120 define a second stage of variable attenuation. The two stages increase the total attenuation range.

For embodiments like those described above in which LC modulator 120 includes non-twisted nematic LCs aligned (in the absence of an applied field) at +/−45 degrees to the x-axis in the x-y plane, the alignment axis of dichoic polarizer 310 can be set to either 0 or 90 degrees to the x-axis in the x-y plane. Assuming polarizer 310 is oriented to absorb light linearly polarized along the x-axis (i.e., it is aligned at 0 degrees to the x-axis), the corresponding equations for $I_y$ and $I_x$ (ignoring any spurious losses) are given by:

$$I_y = \cos^2[\Delta\phi_2/2] \cdot \sin^2[\Delta\phi_3/2] \tag{5}$$

and $$I_x = \sin^2[\Delta\phi_1/2] \cdot \cos^2[\Delta\phi_4/2] \tag{6},$$

If polarizer 310 is instead oriented to absorb light linearly polarized along the y-axis (i.e., it is aligned at 90 degrees to the x-axis), the order of the sin and cos terms in Eqs. (5) and (6) would be reversed.

Eqs. (5) and (6) show that in embodiments where the LC modulator includes only a single addressable region (and as a result $\Delta\phi_1 = \Delta\phi_2 = \Delta\phi_3 = \Delta\phi_4$), a theoretical null in transmission is possible for either $\Delta\phi = 0$ or $\Delta\phi = \pi/2$. However, does not take advantage of the two attenuation stages to produce, in practice, much larger levels of attenuation such as where $\Delta\phi_2 = 0$ and $\Delta\phi_3 = \pi/2$ for $I_y$, and where $\Delta\phi_1 = \pi$ and $\Delta\phi_4 = 0$ for $I_x$. Moreover, in an embodiment with a single addressable region, Eqs. (5) and (6) show that the maximum transmission is 0.25. Thus, while embodiments of VOA 300 include those having only a single addressable region, such embodiments are generally not preferred.

In other embodiments, there are multiple addressable regions so that $\Delta\phi_2$ can be varied independently of $\Delta\phi_3$, and $\Delta\phi_1$ can be varied independently of $\Delta\phi_4$, so that one can independently exploit both stages of attenuation. Thus, very large levels of attenuation are possible (e.g., up to 60 dB), while at the same time full transmission is also possible. Moreover, the independence of the two stages improve resolution and also allow a desired attenuation to be achieved with several possible voltage settings, some of which may correspond to portions of the voltage-birefringence calibration curve that are less sensitive to noise sources (e.g., temperature, aging, voltage errors, etc.). Some of these embodiments may include only two independently addressable regions with $\Delta\phi_1 = \Delta\phi_3$ and $\Delta\phi_2 = \Delta\phi_4$, in which case there is equal attenuation for the orthogonal linear polarization components of input beam 102, i.e., $I_y = I_x$. As described above, this means that the overall attenuation of the output beam relative to the input beam will not depend on the state of polarization of the input beam. Furthermore, in other embodiments, there may at least four independently addressable regions each corresponding to independent control over a different one of $\Delta\phi_1$, $\Delta\phi_2$, $\Delta\phi_3$, and $\Delta\phi_4$. Among other features, this provides VOA 300 with the capability of unequally attenuating the orthogonal linear polarization components of input beam 102, which may be useful for compensating for polarization dependent loss (PDL) in the input beam, as described previously.

In either the embodiment of FIG. 1 or the embodiment of FIG. 3, LC modulator 120 may further include a fixed retarder 250 (as shown in FIG. 2) to provide a fixed offset to the retardance produced by the LC layer. Accordingly, the axes of fixed retarder 250 are aligned with the LC axes. The thickness of fixed retarder 250 is adjusted to achieve a desired transmission level (e.g., nominally full transmission) for the input beam through the VOA in the absence of any control signal to the LC modulator, such as would result in the case of a power failure.

As described above, additional embodiments of the VOA, with or without dichroic polarizer 310, may employ a twisted nematic (TN) layer in LC modulator 120. In a TN LC layer the alignment axis of the LCs in the absence of an applied field rotates within the x-y plane through the thickness of the LC layer (e.g., from 0° to 90° with respect to the x-axis). Such rotation causes a rotation in the polarization of incident light. As a voltage is applied across the TN LC layer, the LCs respond by twisting towards the z-axis. The twisting changes the degree to which the TN LCs rotate the polarization of the incident light. Embodiments of the VOA involving TN LCs may include one or more independently addressable regions as described above in connection with embodiments involving non-twisted nematic LCs.

Referring again to FIGS. 1 and 3, controller 140 responds to a control signal 142 that indicates a desired level of variable attenuation for input beam 102. For example, the control signal may come from an actual or automated network administrator that manages information in the input beam. In response to control signal 142, controller 140 sends one or more drive signals to corresponding elements of LC modulator 120 to produce the desired attenuation. To generate appropriate drive signals, controller 140 stores calibration data for the voltage-dependent birefringence n(V) of the modulator.

Unfortunately, temperature fluctuations or aging of the LC cells can cause the actual calibration to change. To monitor such changes, VOA 100 (or VOA 300) includes a retardance monitor 150, which is coupled to controller 140. Retardance monitor 150 includes a source 152 (e.g., a laser diode or a reference LED with a frequency filter) and a dichroic polarizer 156 (e.g., a thin film polarizer) on one side of LC modulator 120 for producing a polarized reference beam 154. The wavelength of reference beam 154 in the retardance monitor can be selected to be the same as, or different from, that of input beam 102. Retardance monitor 150 further includes a second dichroic polarizer 158 (e.g., a thin film polarizer) and a reference detector 160 (e.g., a photodiode) on the opposite side of LC modulator 120. The dichroic polarizers are aligned relative to the LCs in the modulator to optimize the range of attenuation of the reference beam. For example, where the LCs are non-twisted nematic LCs aligned at +/−45 degrees to the x-axis, each polarizer can be aligned along either the x-axis or the y-axis. During operation, detector 160 measures the attenuation of reference beam 154 in response to LC modulator 120 altering its polarization. The reference beam may pass through an addressable region of the modulator that is common with one or more of the regions corresponding to beams 112a, 112b, 114a, and 114b. Alternatively, it may pass through a separate addressable region. In either case, retardance monitor 150 provides in situ monitoring of changes to the calibration caused by temperature changes and aging. The resulting signal from detector 160 can be used to actively correct the drive signals produced by controller 140 to compensate for any changes to the calibration.

In additional embodiments of the VOAs of FIGS. 1 and 3, right-angle prism 130 may be replaced with another reflective element such as, for example, a mirror oriented at non-normal incidence or a corner-cube retroreflector. However, one advantage of right-angle prism 130 is that in embodiments of the VOA that do not include dichroic polarizer 310, polarization-rotation effects caused by the right angle prism can be easily compensated by retarder 132. Another advantage of the right-angle prism is it allows VOA 100 or VOA 300 to easily accommodate an array of input beams to produce an array of output beams, each array extending parallel to the y-axis.

Figure 4D:
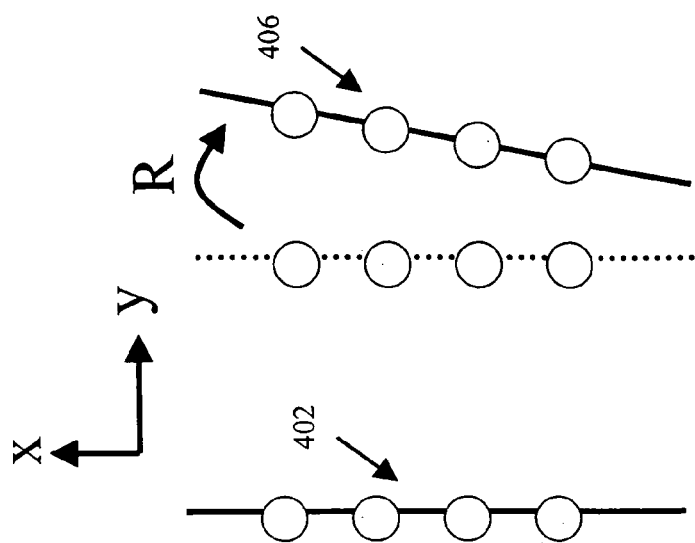

Such an arrangement is shown in FIGS. 4a–d. Referring to FIGS. 4a–b, a folded LC VOA 400 is shown for independently attenuating multiple input beams 402 from an input fiber array 404 to produce a corresponding set of multiple output beam 406 that couple to an output fiber array 408. FIG. 4a shows a cross-sectional view in the x-z plane, whereas FIG. 4b shows a cross-sectional view in the y-z plane along line 470 in FIG. 4a. VOA 400 includes birefringent element 410, a LC modulator 420, and a right angle prism 430 to direct beams back through the LC modulator and the birefringent element. A controller (not shown) drives LC modulator 420. VOA 400 operates the same as VOA 100 described above, except that LC modulator 420 includes multiple sets of one or more independently addressable regions extending along the y-axis for accommodating each of input beams 402. VOA 400 may further include a retardance monitor (not shown) in analogy to retardance monitor 150 described above. Also, VOA 400 may further include a compensating retarder (not shown) between LC modulator 420 and prism 430 in analogy to retarder 132 described above. Alternatively, VOA 400 may include a dichroic polarizer (not shown) positioned between LC modulator 420 and prism 430 in analogy to dichroic polarizer 310, in which case VOA 400 operates similarly to VOA 300.

Fiber arrays 404 and 408 are secured to a common housing with the elements of VOA 400 and may include collimating elements such as micro-lenses or gradient-index lenses. Alternatively, such collimating elements may be part of VOA 400 and define corresponding input and output ports (not shown).

One advantage of using right-angle prism 430 in VOA 400 is that by translating its position along the x-axis or rotating it with respect to the z-axis, one can align the input and output beams with their respective fiber arrays. This is illustrated in FIGS. 4c–d, which show input beams 402 and output beams 406 in the x-y plane along the lines 472 and 474 in FIGS; 4a and 4b, respectively.

Figure 4C:
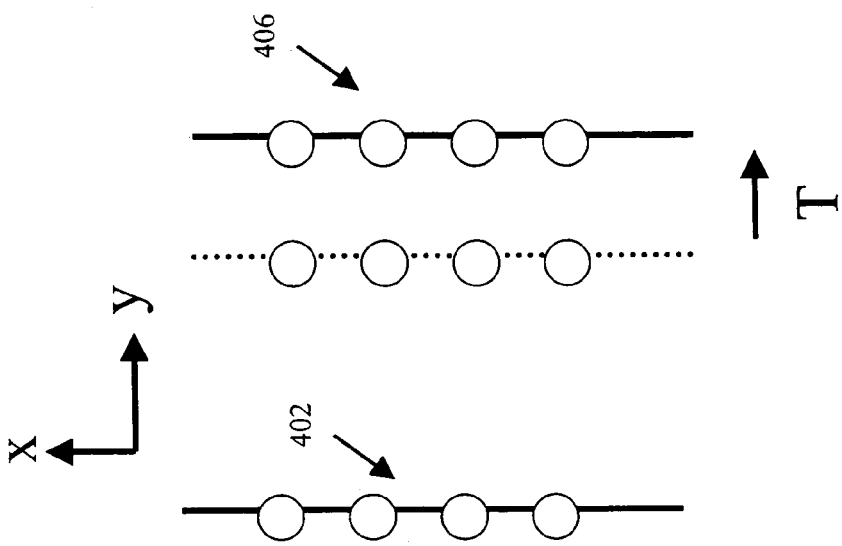

FIG. 4c shows that for a given set of input beams 402, translating the position of right angle prism 430 along the x-axis produces a corresponding translation "T" of output beams 406 uniformly along the x-axis. On the other hand, FIG. 4d shows that for a given set of input beams 402, rotating right angle prism 430 about the z-axis (so that the fold-axis of the prism is only nominally parallel to the y-axis) produces a corresponding rotation R of the array of output beams 406. Such changes in the position and orientation of prism 430 can be used to optimize the coupling of the output beams to the output fiber array. Accordingly, fiber arrays 404 and 408 can be mounted to VOA 400 with only coarse alignment. Thereafter, the position and orientation of prism 430 can adjusted to optimize the alignment (e.g., by optical measuring the coupling efficiency from the input fibers to the output fibers). Once its position and orientation are optimized, the prism can be more rigidly secured to the other elements of the VOA.

Figure 5:
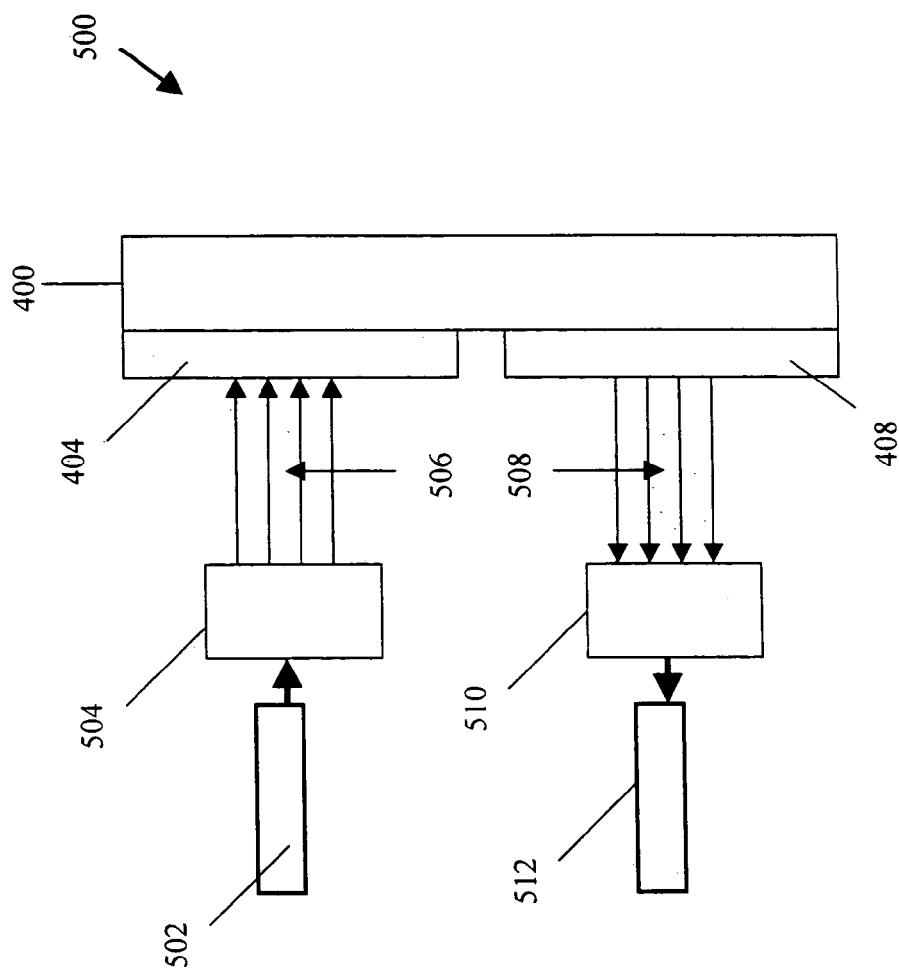
FIG. 5 is a schematic diagram of a spectral band equalization system 500 based on LC VOA 400 shown in FIGS. 4a–4d.

Because VOA 400 can independently attenuate multiple input signals, it can be used for spectral band equalization in wavelength-division multiplexed (WDM) signals in which multiple signals are carried at different wavelengths in a common fiber. Such a system 500 is shown schematically in FIG. 5. A multi-channel input fiber 502 carries a WDM input signal to a demultiplexer 504, which separates the WDM signal into separate signals corresponding to the WDM channels. The separated signals are carried by multiple fibers 506 to input fiber array 404, which couples them to VOA 400. VOA independently attenuates each of the separate signals. For example, it may equalize the intensities of the different channels. Output fiber array 408 receives the attenuated output signals from VOA 400, which are then sent by multiple fibers 508 to a multiplexer 510. Multiplexer 510 combines the attenuated optical signal and couples them to a multi-channel output fiber 512, which carries them as a WDM output signal.

A number of embodiments of the invention have been described. Nevertheless, it will be understood that various modifications may be made without departing from the spirit and scope of the invention.

What is claimed is:

1. A variable optical attenuator comprising
   a birefringent element positioned to separate an input optical signal into two spatially separated, orthogonally polarized beams;
   a LC modulator positioned to receive the orthogonally polarized beams and independently alter their polarizations;
   a reflective element positioned to reflect the beams back through the LC modulator and the birefringent element, wherein the birefringent element recombines orthogonally polarized components of the reflected beams to produce an output optical signal; and
   a controller coupled to the LC modulator to selectively cause the LC modulator to alter the polarizations of the orthogonally polarized beams, wherein during operation the controller is responsive to a request to variably attenuate the intensity of the output optical signal relative to the intensity of the input optical signal to one of multiple non-zero attenuation settings.

2. The variable optical attenuator of claim 1, further comprising an input port positioned to direct the input optical signal into the birefringent element and an output port positioned to receive the output optical signal from the birefringent element.

3. The variable optical attenuator of claim 2, further comprising additional input ports each directing an additional input optical signal into the birefringent element and on through the LC modulator and the reflective element, and additional output ports each positioned to receive an additional output optical signal from the birefringent element, wherein each additional output optical signal corresponds to one of the additional input optical signals after it is reflected back through the LC modulator and the birefringent element by the reflective element.

4. The variable optical attenuator of claim 3, wherein the reflective element is a prism.

5. The variable optical attenuator of claim 4, wherein the prism is a right-angle prism, and wherein the additional input ports and the additional output ports each extend along an axis substantially parallel to a fold axis defined by the right-angle prism.

6. The variable optical attenuator of claim 1, wherein the LC modulator includes multiple, independently addressable regions for selectively altering the polarization of an incident beam.

7. The variable optical attenuator of claim 1, further comprising a polarizer positioned between the LC modulator and the reflective element.

8. The variable optical attenuator of claim 7, wherein the polarizer is a dichroic polarizer positioned to absorb a selected polarization component of the beams for a first pass from the LC modulator to the reflective element and for a second pass from the reflective element back to the LC modulator.

9. The variable optical attenuator of claim 8, wherein the dichroic polarizer has a dichroic axis aligned either parallel or orthogonal to an axis defined by the spatial separation of the orthogonally polarized beams derived from the input beam.

10. The variable optical attenuator of claim 1, wherein the reflective element is a mirror oriented to receive the beams at a non-normal angle.

11. The variable optical attenuator of claim 1, wherein the reflective element is a corner cube retroreflector.

12. The variable optical attenuator of claim 1, wherein the reflective element is a prism.

13. The variable optical attenuator of claim 12, wherein the prism is a right-angle prism.

14. The variable optical attenuator of claim 13, further comprising a retarder element positioned between the LC modulator and the right-angle prism, wherein the retarder element is configured to offset polarization-dependent phase changes to the beams caused by non-normal reflections from the right-angle prism.

15. The variable optical attenuator of claim 1, further comprising a LC monitor coupled to the LC modulator and the controller.

16. The variable optical attenuator of claim 15, wherein the LC monitor comprises a reference light source providing a polarized source beam and which during operation directs the polarized reference beam through an active region of the LC modulator to produce a signal beam, a polarizer positioned to receive the signal beam and produce a polarized signal beam, and a detector for monitoring the intensity of the polarized signal beam.

17. The variable optical attenuator of claim 16, wherein the reference light source comprises an LED or a laser diode, in series with a film polarizer.

18. The variable optical attenuator of claim 1, wherein the LC modulator provides a tunable retardance spanning a range of less than 450 nm for a single pass.

* * * * *

UNITED STATES PATENT AND TRADEMARK OFFICE
CERTIFICATE OF CORRECTION

PATENT NO.       : 7,046,417 B2
APPLICATION NO.  : 10/885206
DATED            : May 16, 2006
INVENTOR(S)      : Clifford C. Hoyt and Peter J. Miller It is certified that error appears in the above-identified patent and that said Letters Patent is hereby corrected as shown below:

Column 2
Line 36, insert --an-- before "angle"

Column 5
Line 16, replace "indeperdently" with --independently--

Column 8
Line 62, replace "region" with --regions--

Column 9
Line 22, replace "Lc" with --LC--

Column 10
Line 27, insert --it-- after "However,"

Column 12
Line 58, insert --be-- after "can"

Column 13
Line 11, replace "signal" with --signals--

Signed and Sealed this

Twenty-ninth Day of May, 2007

JON W. DUDAS
*Director of the United States Patent and Trademark Office*